(12) United States Patent
Andriolli et al.

(10) Patent No.: US 8,724,988 B2
(45) Date of Patent: May 13, 2014

(54) SYNCHRONOUS PACKET SWITCHES

(75) Inventors: Nicola Andriolli, Rovigo (IT);
Antonella Bogoni, Mantova (IT);
Alberto Bianchi, Marina di Pisa (IT);
Piero Castoldi, Parma (IT); Luca Poti,
Pisa (IT); Pier Giorgio Raponi, Pisa
(IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 56 days.

(21) Appl. No.: 13/319,067

(22) PCT Filed: Jul. 22, 2009

(86) PCT No.: PCT/EP2009/059412
§ 371 (c)(1),
(2), (4) Date: Jan. 24, 2012

(87) PCT Pub. No.: WO2010/127716
PCT Pub. Date: Nov. 11, 2010

(65) Prior Publication Data
US 2012/0121262 A1 May 17, 2012

(30) Foreign Application Priority Data
May 5, 2009 (EP) .................................... 09159422

(51) Int. Cl.
*H04J 14/00* (2006.01)
*H04B 10/20* (2011.01)

(52) U.S. Cl.
USPC .................................. 398/49; 398/51; 398/55

(58) Field of Classification Search
USPC ........... 398/43, 45, 49, 50; 370/380, 389, 534
See application file for complete search history.

(56) References Cited

U.S. PATENT DOCUMENTS

| | | | |
|---|---|---|---|
| 6,647,208 B1 | 11/2003 | Kirby | |
| 6,768,827 B2 * | 7/2004 | Yoo | 385/14 |
| 7,039,316 B2 * | 5/2006 | Chang et al. | 398/51 |
| 7,245,829 B1 * | 7/2007 | Sindile | 398/45 |
| 2003/0043426 A1 * | 3/2003 | Baker et al. | 359/109 |

(Continued)

OTHER PUBLICATIONS

Jin et al, Optical Cross Connect Based on WDM and Space-Division Multiplexing (Published in IEEE Photonics Technology Letters vol. 7, No. 11, Nov. 1995).*

(Continued)

*Primary Examiner* — David Payne
*Assistant Examiner* — Casey Kretzer
(74) *Attorney, Agent, or Firm* — Blakely Sokoloff Taylor & Zafman LLP

(57) ABSTRACT

A synchronous packet switch comprises output modules, input modules, optical connections and a switch control unit. The output modules comprise optical receivers each configured to receive optical signals at a different wavelength. The input modules receive electric signals carrying data cells to be routed. Each input module comprises optical transmitters, each configurable to generate an optical signal at a different wavelength, and routing apparatus comprising output ports. Each output module has at least one output port allocated to it. The routing apparatus is configurable to route a received optical signal to a selected output port. The optical connections are arranged to couple output ports to respective output modules. The switch control unit controls routing of the optical signals from the transmitters to the output modules and generates a routing control signal for configuring the routing apparatus to route an optical signal from a transmitter to a selected output port.

10 Claims, 13 Drawing Sheets

(56) References Cited

U.S. PATENT DOCUMENTS

| | | | |
|---|---|---|---|
| 2004/0151171 A1* | 8/2004 | Lee et al. | 370/380 |
| 2007/0286599 A1* | 12/2007 | Sauer et al. | 398/28 |
| 2008/0247387 A1 | 10/2008 | Neilson | |

OTHER PUBLICATIONS

Choi et al, A Photonic ATM Switch based on Wavelength Routing (Published in IEEE 1999).*

Young-Bok Choi et al., "A Photonic ATM Switch based on Wavelength Routing," 1999 IEEE TENCON, 4 pages.

Y. D. Jin et al., "Optical Cross Connect Based on WDM and Space-Division Multiplexing," Nov. 1995, 3 pages, IEEE Photonics Technology Letters, vol. 7, No. 11, New York, US.

Isaac Keslassy et al., "Scaling Internet Routers Using Optics," 2003, 12 pages, SIGCOMM '03, Aug. 25-29, 2003, Karlsruhe, Germany.

International Search Report, Application No. PCT/EP2009/059412, dated Jan. 26, 2010, 3 pages.

* cited by examiner

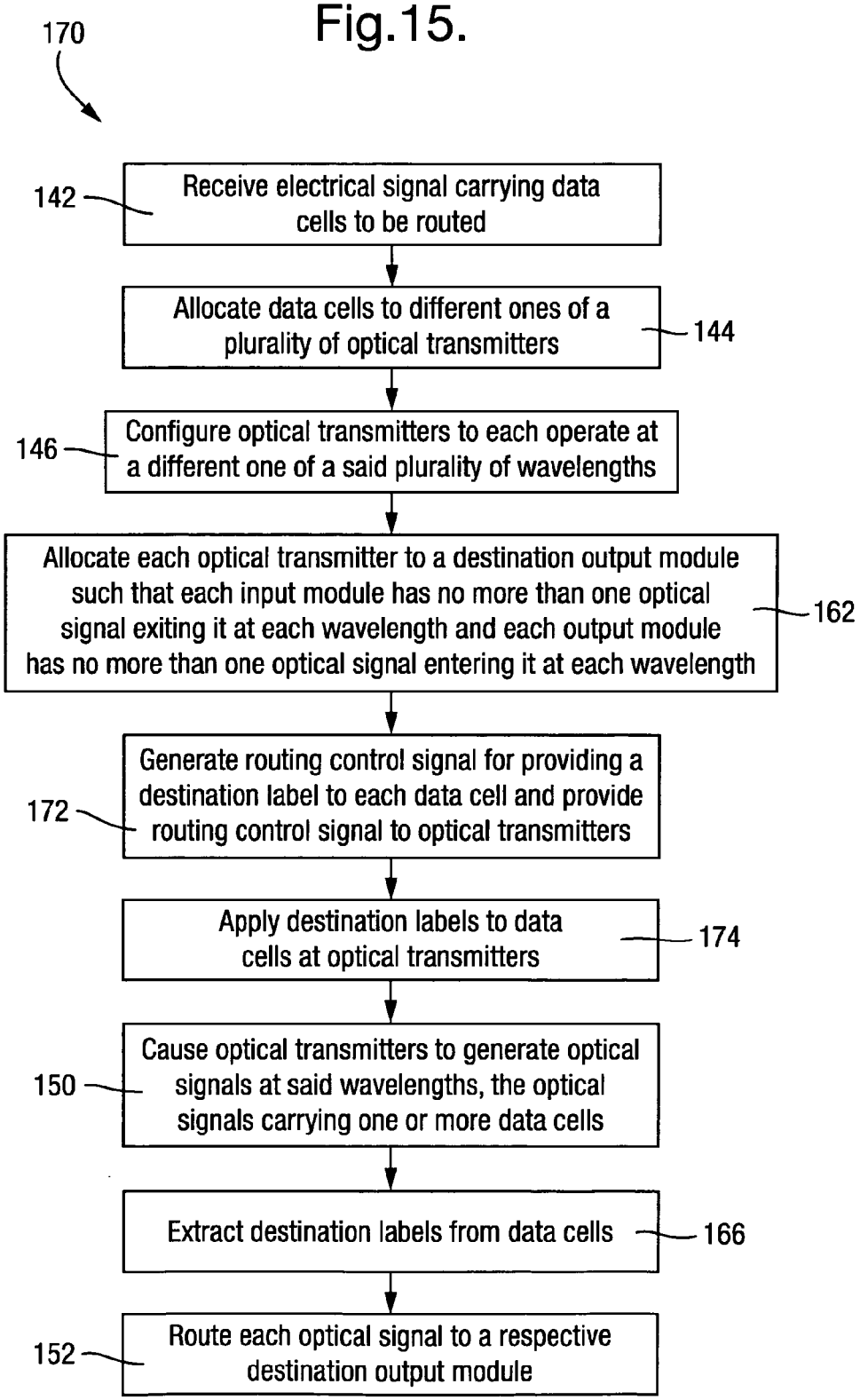

SYNCHRONOUS PACKET SWITCHES

CROSS-REFERENCE TO RELATED APPLICATIONS

This application is a National stage of International Application No. PCT/EP2009/059412, filed Jul. 22, 2009, which claims priority to European Application No. 09159422.6, filed May 5, 2009, which are hereby incorporated by reference.

FIELD OF THE INVENTION

The invention relates to a synchronous packet switch, to a collector card for a synchronous packet switch and to a method of routing data in a synchronous packet switch.

BACKGROUND OF THE INVENTION

The amount of data required to be handled by communications networks continues to rise. Next generation backbone networks will have to cope with data traffic arriving from more and faster interfaces, and will need to provide a data throughput in the range of tens or hundreds of Terabits per second (Tb/s). High-end routers in backbone networks are typically all-electronic, with all routing functions realized in the electronic domain. However, these all-electronic routers are approaching their fundamental limitations, mainly in terms of power density. Multi-rack systems have been designed to reduce this problem but this solution further increases the overall power required by the router and the router footprint, and poses problems related to inter-rack wiring and communications. All-optical packet switching networks, i.e. networks where optical packets are optically forwarded end-to-end, have been proposed but do not to satisfy the huge bandwidth and cost-effectiveness requirements of next generation backbone networks. Hybrid optical/electrical routers have been proposed, such as the hybrid electronic/optical switch system described in U.S. Pat. No. 6,647,208, in which some optical data is routed optically and other optical data is optical to electronic (O/E) converted and routed electronically, to reduce the amount of data being routed electronically, however such hybrid switches require very complicated control systems.

SUMMARY OF THE INVENTION

It is an object to provide an improved synchronous packet switch. It is a further object to provide an improved collector card for a synchronous packet switch. It is a further object to provide an improved method of routing data through a synchronous packet switch.

A first aspect of the invention provides a synchronous packet switch comprising a first plurality of output modules, a said first plurality of input modules, a third plurality of optical connections and a switch control unit. The said output modules each comprise a second plurality of optical receivers. The said optical receivers are each configured to receive optical signals at a different one of a said second plurality of wavelengths. The said input modules are arranged to receive electric signals carrying data cells to be routed. Each said input module comprises a said second plurality of optical transmitters and routing apparatus. The said optical transmitters are each operable to generate an optical signal carrying one or more of said data cells. The said optical transmitters are configurable such that each optical transmitter is operable to generate a said optical signal at a different one of the said second plurality of wavelengths. The said routing apparatus comprises a plurality of output ports. Each said output module has at least one said output port allocated to it. The said routing apparatus is arranged to receive said optical signals at said different wavelengths and is configurable to route each said received optical signal to a selected output port. The said optical connections are arranged to couple the said output ports to the respective said output modules. The said switch control unit is arranged to control routing of said optical signals from said transmitters to said output modules. The said switch control unit is further arranged to generate a routing control signal for configuring the said routing apparatus to route a said optical signal from a said transmitter to a selected one of said output ports.

A synchronous packet switch is thus provided which receives and transmits data in the electrical domain and switches data in the optical domain. The footprint and electrical power consumption requirements of the synchronous packet switch can thus be reduced to less than that for equivalent known electronic routers. The synchronous packet switch can perform cell based routing, providing finer granularity than known packet switches.

In an embodiment, said transmitters are arranged to receive said routing control signal and to provide a destination label according to said routing control signal to each said received data cell to be transmitted. Each said input module further comprises a label extractor. Said label extractor is arranged to extract said destination labels from transmitted ones of said data cells carried by said optical signals and to generate a further routing control signal for configuring said routing apparatus. The said label extractor is an all-optical label extractor.

The synchronous packet switch thereby switches data cells by applying both wavelength and label based routing.

In an embodiment, said routing apparatus is arranged to receive said routing control signal In an embodiment, each said routing apparatus comprises a said second plurality of 1×M optical switches. Each said optical switch has one input port and M output ports, where M is a fourth plurality. Each of said optical receivers has a different said output port allocated to it. Each of the said optical switches is allocated to a different one of said second plurality of wavelengths. Each of the said optical switches is configurable to route a received optical signal to a selected one of said output ports.

In an embodiment, each said routing apparatus further comprises a multiplexer and a wavelength selective router. The said multiplexer is arranged to received the said optical signals from the said optical transmitters and to multiplex the said optical signals into a multiplexed optical signal comprising a said second plurality of wavelength components. The said wavelength selective router is arranged to receive said multiplexed optical signal and to demultiplex and route each said wavelength component to a respective one of said optical switches.

In an embodiment, said output ports of said routing apparatus comprise said output ports of said optical switches.

In an alternative embodiment, each said routing apparatus further comprises a said fourth plurality of output multiplexers each comprising a multiplexed output port. Each said output module has a different one of said output multiplexers allocated to it. Each said output multiplexer is coupled at an input side to said output ports of said optical switches allocated to said optical receivers of its respective said output module. Said output ports of said routing apparatus comprise said multiplexed output ports. In an embodiment, said output multiplexers comprise arrayed waveguide gratings.

In an embodiment, said wavelength selective router comprises an arrayed waveguide grating. Said multiplexer may comprise a N:1 optical coupler, where N is said second plurality, having N input ports and one output port.

In an embodiment, each said input module further comprises a module control unit. The said module control unit is arranged to assign a received data cell to one of said second plurality of wavelengths for transmission to a said output module.

In an embodiment, said optical transmitters comprise tunable optical transmitters. The said module control unit is operable to assign a different one of said second plurality of wavelengths to each of the said transmitters. The said module control unit is further operable to generate a wavelength control signal for configuring each said transmitter to operate at said assigned wavelength.

Each said optical transmitter is provided with an input buffer, comprising said first plurality multiplied by said second plurality of virtual output queues. The synchronous packet switch therefore stores data cells received in the electrical domain in virtual output queues in the electrical domain and the optical domain is only used for switching of the date cells through the switch.

The module control unit thereby performs intra-module scheduling of data cells for transmission, enabling data throughput to be optimized.

In an embodiment, each said tunable optical transmitter comprises a tunable laser having a tuning time of less than ten percent (10%) of a cell time in which data cells are to be transmitted. In an embodiment, each tunable optical transmitter is provided with an input buffer operable to receive and store said data cells in one or more virtual output queues.

In an embodiment, each said module control unit is further arranged to generate a wavelength assignment signal for identifying said one of said second plurality of wavelengths assigned to each of its respective said transmitters. Said switch control unit is arranged to receive said wavelength assignment signal. Said switch control unit is further arranged, for each of said second plurality of wavelengths, to allocate each said transmitter assigned said wavelength to one of said output modules. Said transmitters are allocated to said output modules such that each input module has no more than one said optical signal exiting it at each of said second plurality of wavelengths and each output module has no more than one said optical signal entering it at each of said wavelengths. Said routing control signal is for configuring said routing apparatus according to said allocation of said transmitters to said output modules.

The switch control unit thus performs inter-module scheduling of data cells for switching, enabling data throughput to be optimized.

In an embodiment, said output ports of said routing apparatus comprise said output ports of said optical switches.

In an alternative embodiment, each said routing apparatus further comprises a said fourth plurality of output multiplexers each comprising a multiplexed output port. Each said output module has a different one of said output multiplexers allocated to it. Each said output multiplexer is coupled at an input side to said output ports of said optical switches allocated to said optical receivers of its respective said output module. Said output ports of said routing apparatus comprise said multiplexed output ports. In an embodiment, said output multiplexers comprise arrayed waveguide gratings.

In an embodiment, each said output module further comprises a said second plurality of M×1 optical switches, each having M input ports and one output port, where M is said fourth plurality. Said output port of each of said optical switch is coupled to a respective different one of said optical receivers of said output module. Said input ports of each said optical switch are respectively coupled to said output ports allocated to said respective optical receiver. In an embodiment, said switch control unit is further operable to generate and transmit a further control signal arranged to configure the said optical switches in the said output modules.

In an alternative embodiment, said optical connections further comprise a said third plurality of M:1 optical multiplexers, each having M input ports and one output port, where M is said fourth plurality. Each said optical receiver is allocated to a different one of said optical multiplexers. Said output port of each of said optical multiplexer is coupled to a respective different one of said optical receivers. Said input ports of each said optical multiplexer are respectively coupled to said output ports allocated to said respective optical receiver. In an embodiment, said optical multiplexers comprise M:1 optical couplers and each said output module further comprises a single channel optical amplifier provided before each said optical receiver.

In an alternative embodiment, said third plurality comprises said fourth plurality multiplied by said fourth plurality and said optical connections further comprise a said fourth plurality of M:1 optical multiplexers, each having M input ports and one output port, where M is said fourth plurality. Each said multiplexer is arranged to receive a said second plurality of optical signals. No more than one said optical signal is received at each of said second plurality of wavelengths. Each said multiplexer is arranged to multiplex the said optical signals into a multiplexed optical signal comprising a said second plurality of wavelength components. Each said output module is allocated to a different one of said optical multiplexers. Each said output module further comprises a wavelength selective optical router arranged to receive a said multiplexed optical signal and to demultiplex and route each said wavelength component to a respective one of said optical receivers. Each said output module may further comprise a multi-channel optical amplifier provided before each said wavelength selective optical router. In an embodiment, said wavelength selective optical routers comprise arrayed waveguide gratings.

In an embodiment, the said optical connections are arranged to couple the said output ports of a said fourth plurality of said input modules to a said fourth plurality of said output modules. The said first pluralities of input modules and output modules comprising the said switch are less than or equal to the said fourth plurality. The synchronous packet switch can thus be configured to operate in an underequipped configuration and the number of input modules and output modules may be increased to the said fourth plurality maximum as the amount of data traffic to be switched increases, giving the switch high scalability.

The synchronous packet switch therefore has entirely passive optical connections between the input modules and the output modules.

In an embodiment, each said optical receiver comprises a photodetector operable to detect optical signals at a fixed one of said second plurality of wavelengths.

A second aspect of the invention provides a collector card for a synchronous packet switch. Said collector card comprises an input module arranged to receive electric signals carrying data cells. Said input module comprises a plurality of optical transmitters and routing apparatus. Said optical transmitters are each operable to generate an optical signal carrying one or more received data cells. Said optical transmitters are configurable such that each optical transmitter is operable to generate a said optical signal at a different one of the said wavelengths. Said routing apparatus is arranged to receive said optical signals at said different wavelength. Said routing apparatus is configurable to route each said received optical signal to a selected output port.

A collector card is thus provided which receives data in the electrical domain and converts the data to the optical domain for switching. The footprint and electrical power consumption requirements of the collector card can thus be reduced to less than that for equivalent known electronic cards.

In an embodiment, said transmitters are arranged to receive a routing control signal and to provide a destination label according to said routing control signal to each said received data cell to be transmitted. Each said input module further comprises a label extractor. Said label extractor is arranged to extract said destination labels from transmitted ones of said data cells carried by said optical signals. Said label extractor is further arranged to generate a further routing control signal for configuring said routing apparatus.

The collector card thereby routes data cells by applying both wavelength and label based routing.

In an embodiment, said input module further comprises a module control unit arranged to assign a received data cell to one of said second plurality of wavelengths for transmission. In an embodiment, said optical transmitters comprise tunable optical transmitters. Said module control unit is operable to assign a different one of said second plurality of wavelengths to each of the said transmitters. Said module control unit is operable to generate a wavelength control signal for configuring each said transmitter to operate at said assigned wavelength.

The module control unit thereby performs intra-module scheduling of data cells for transmission, enabling data throughput to be optimized.

In an embodiment, said collector card further comprises an output module. Said output module comprises a said plurality of optical receivers each configured to receive optical signals at a different one of said plurality of wavelengths.

A third aspect of the invention provides method of routing data in a synchronous packet switch. The method comprises:
receiving at least one electrical signal carrying data cells to be routed;
allocating said data cells to different ones of a plurality of optical transmitters;
configuring said optical transmitters to each operate at a different one of a said plurality of wavelengths;
allocating each said optical transmitter to a destination output module of said switch;
causing said optical transmitters to generate optical signals at said plurality of wavelengths, said optical signals carrying one or more of said data cells; and
routing each said optical signal to a respective said destination output module.

The method thus enables receipt of data cells in the electrical domain and switching of data cells in the optical domain, enabling the footprint and electrical power consumption requirements of a synchronous packet switch implementing the method to be reduced to less than that for equivalent known electronic routers.

In an embodiment, said method further comprises applying a destination label to each said data cell. Said destination label identifies said destination output module allocated to said optical transmitter to which said data cell is allocated. Said routing comprises extracting said label from said data cell and routing the respective said optical signal carrying said data cell to said destination output module identified by said destination label.

The method thus provides routing of data cells by applying both wavelength and label based routing.

In an embodiment, said method further comprises: generating a routing control signal for providing a said destination label to each said data cell;
providing said routing control signal to said respective optical transmitter; and
said optical transmitter applying said destination label to said data cell.

In an embodiment, a said plurality of optical transmitters are provided within each of a second plurality of input modules of the said switch. Said optical transmitters in each said input module are configured to each operate at a different one of said plurality of wavelengths. For each said plurality of wavelengths, each said optical transmitter is allocated to a said destination output module such that each said input module has no more than one said optical signal exiting it at each of said plurality of wavelengths and each output module has no more than one said optical signal entering it at each of said wavelengths.

A fourth aspect of the invention provides a data carrier, such as a non-transitory, computer readable storage medium, having computer readable instructions embodied therein for providing access to resources available on a processor. The computer readable instructions comprise instructions to cause the processor to perform any of the above steps of the method of routing data in a synchronous packet switch.

Embodiments of the invention will now be described in detail, by way of example only, with reference to the accompanying drawings.

BRIEF DESCRIPTION OF THE DRAWINGS

FIG. 15 shows the steps of a method of routing data cells through a synchronous packet switch according to a thirteenth embodiment of the invention.

DESCRIPTION OF EMBODIMENTS OF THE INVENTION

Figure 1:
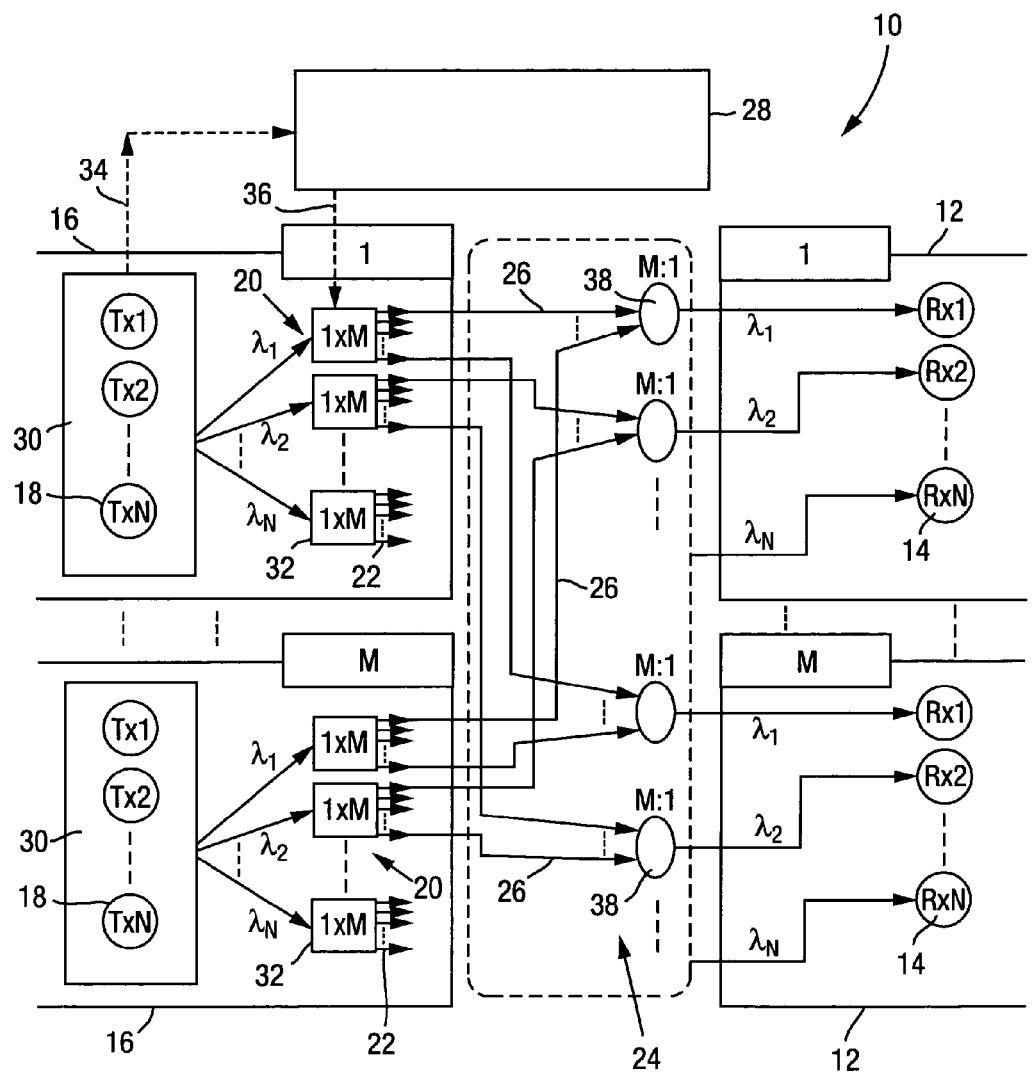
FIG. 1 is a schematic representation of a synchronous packet switch according to a first embodiment of the invention.

Referring to FIG. 1, a first embodiment of the invention provides a synchronous packet switch 10 comprising M output modules 12 (only two are shown for clarity), M input modules 16 (only two are shown for clarity), optical connections 26, 38 and a switch control unit 28. The switch 10 is arranged to switch data in the optical domain and is arranged to receive electrical signals carrying data cells to be routed and to transmit further electrical signals carrying data cells having been switched. The synchronous packet switch 10 is operable to route fixed length packets of cells at each packet time.

Each output module 12 comprises N optical receivers 14, which in this example comprise fixed wavelength photo detectors. Each optical receiver 14 is configured to receive optical signals at a different 1 of N wavelengths ($\lambda_1$-$\lambda_N$).

Each input module 16 terminates N input channels, each delivering electrical signals carrying data cells to be routed by the switch 10. Each input module 16 comprises N optical transmitters 18. In this example, the optical transmitters 18 comprise fast tunable optical transmitters, such as superstructure grating distributed Bragg reflector (SSG-DBR) lasers, sampled grating DBR (SG-DBR) lasers, or grating-assisted coupler with sampled reflector (GCSR) lasers. The optical transmitters 18 are each operable to generate an optical signal carrying one or more of the received data cells in each packet time. The optical transmitters 18 are configurable such that each optical transmitter within an input module 16 is operable to generate an optical signal at a different one of the said N wavelengths. In this example, at each packet time the optical transmitters in each input module 16 are tuned to each operate at a different one of the N wavelengths.

The data cells received by the input modules 16 are received at each transmitter 18. Each optical transmitter 18 is input buffered, with the buffer comprising M×N virtual output queues (VOQs), being equal to the number of output ports (optical receivers 14) of the switch 10.

Each input module 16 further comprises a module control unit 30 which is operable to assign a different one of the N wavelengths to each of the optical transmitters 18 within its respective input module 16. The module control unit 30 is further operable, following the wavelength assignment, to generate and transmit a wavelength control signal to the optical transmitters 18, to cause the optical transmitters to tune to their respectively assigned wavelengths. The module control unit 30 is also arranged to generate a wavelength assignment signal 34 for identifying which wavelength has been assigned to which optical transmitter 18, and to transmit the wavelength assignment signal 18 to the switch control unit 28.

Each input module 16 also comprises a routing apparatus 20, which in this example takes the form of N 1×M optical switches 32. The optical switches 32 in this example comprise optical space switches, each having one input port and M output ports 22. The outputs of the optical transmitters 18 are coupled to the optical switches 32, such that each optical switch 32 receives an optical signal at a different one of the N wavelengths. The output ports 22 of the optical switches 32 are coupled to optical receivers 14 operating at a corresponding wavelength in each of the output modules 12.

The switch control unit 28 is arranged to control routing of optical signals from the optical transmitters 18 to the output modules 12. The switch control unit 28 is operable to allocate the optical transmitters 18 to the output modules 12 as follows. For each of the N wavelengths, the switch control unit 28 is arranged to allocate each transmitter 18 assigned that wavelength to one of the output modules 12. In this example, the optical transmitters 18 are allocated to an output module 12 using an iterative maximal matching scheduling algorithm, such as an iterative serial-line IP (iSLIP) matching algorithm. The iSLIP matching algorithm will be well known to the person skilled in the art (see for example McKeown, N., "The iSLIP scheduling algorithm for input-queued switches," IEEE/ACM Trans. NETW., vol 7, number 2, pp 188 to 201, April 1999). In this example, the optical transmitters 18 are allocated such that each input module 16 has no more than one optical signal exiting it at each of the N wavelengths and each output module 12 has no more than one optical signal entering it at each of the N wavelengths.

The switch control unit 28 is also arranged to generate a routing control signal 36, for configuring the optical switches 32 to route the optical signal at each wavelength to the respective output 22 coupled to its destination output module 12.

The optical connections 26, 38 are provided within an optical backplane 24 and comprise optical fibres 26 and M×N M:1 optical couplers 38; one optical coupler is provided for each of the N wavelengths entering each of the M output modules 12 (less than all of the fibres 26 and coupler 38 are shown for clarity). Each output port 22 of the switches 32 in the input modules 16 is connected to the coupler 38 connected to its respective output module 12 by an optical fibre 26. Each coupler 38 collects all of the optical fibres 26 connected to output ports 22 on optical switches 32 routing a particular wavelength to a particular output module 12. For example, the coupler 38 shown at the top of the backplane 24 in FIG. 1 connects all of the connecting fibres 26 coupled to output ports 22 for routing optical signals at $\lambda_1$ to the first output module 12, which in this example comprises all of the optical fibres exiting from the first output port 22 of the first optical switch 32 of each input module 16. In general terms, the (i,j)th coupler, where i=1, 2, ... N and j=1, 2, ..., M, collects all the optical fibres 26 exiting from the jth port of the ith optical switch 32 of each input module 16. The output signal, for example $\lambda_1$, from the output coupler 38 is connected to the respective optical receiver 14 configured to receive optical signals at that wavelength.

In general terms, the synchronous packet switch 10 operates as follows. Each input module 16 receives electrical signals carrying data cells to be routed. The data cells are arranged to be synchronously routed through the switch 10 during subsequent packet times. At the beginning of every packet time, cells to be switched during that packet time are allocated to optical transmitters 18, and each optical transmitter is allocated one of the N wavelengths and is tuned to operate at its allocated wavelength. A wavelength assignment signal 34 is sent to the switch control unit 28 which allocates each transmitter 18 to an output module 12 and generates a routing control signal 36, transmitted to the optical switches 32. The optical transmitters 18 generate optical signals at their allocated wavelengths carrying their allocated data cells. The optical signals are routed to the respective optical switch 32 for each wavelength. The optical switches 32 are configured according to the routing control signal 36 to route their respective received optical signal to the optical port 22 connected to the required output module 12. The optical signals are routed via the respective optical fibres 26 and couplers 38 to the respective output module 12 and the optical receiver 14 configured to receive optical signals at the respective wavelength.

The routing of data cells by the synchronous packet switch 10 is therefore based on two criteria, namely the wavelength of the optical signal carrying the data cells and the destination output module 12. The destination output module 12 is allocated by the switch control unit 28 and the routing to the destination output module 12 is controlled by the routing control signal 36 configuring the optical switches 32. The destination optical receiver 14 within the output module 12 is determined by the wavelength of the optical signal carrying the data cells.

The number of input modules 16 is equal to the number of output modules 12. The optical backplane 24 comprises M×N optical couplers 38 and (M×N)×M optical fibres 26, to couple M input modules 16 to M output modules 12. In practice however, the synchronous packet switch 10 may comprise fewer than the maximum number of M input modules 16 and output modules 12 (although a matching number of input modules 16 and output modules 12 should always be provided), while the optical connections 26, 38 remain configured to connect M input modules 16 to M output modules 12. The synchronous packet switch 10 can thus operate in an underequipped configuration, allowing the size of the synchronous packet switch 10 to be expanded up to the maximum of M input modules and M output modules 12 as the amount of data to be routed by the synchronous packet switch 10 increases.

Figure 2:
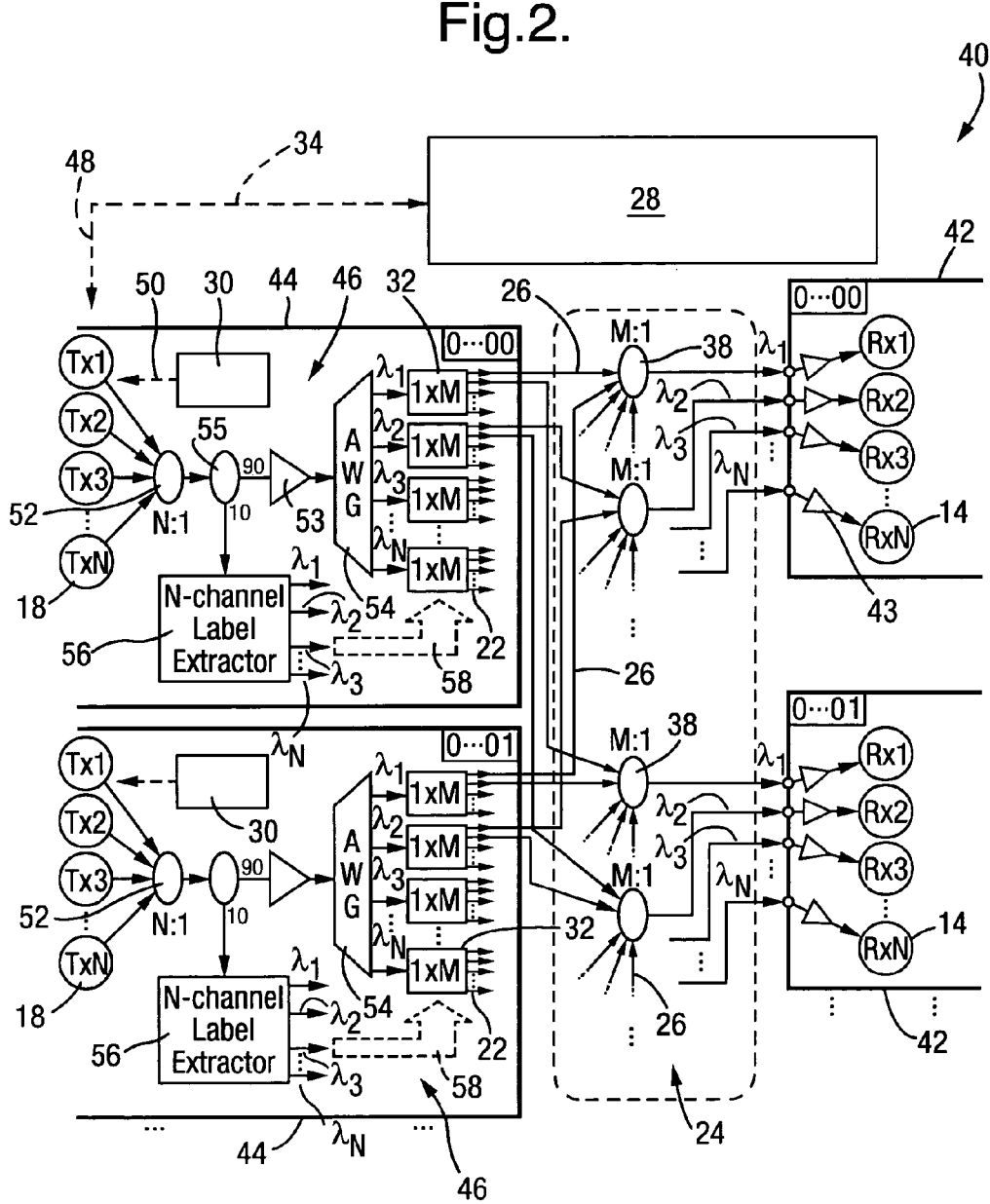
FIG. 2 is a schematic representation of a synchronous packet switch according to a second embodiment of the invention.

Referring to FIG. 2, a second embodiment of the invention provides a synchronous packet switch 40 which is generally the same as the synchronous packet switch 10 of the first embodiment, with the following modifications. The same reference numbers are used for corresponding features. The synchronous packet switch 40 of this embodiment comprises M input modules 44 (only two are shown for clarity), M output modules 42 (only two are shown for clarity), optical connections 26, 38 (not all are shown for reasons of clarity) and a switch control unit 28.

The output modules 42 are substantially the same as the output modules 12 of the first embodiment, with the modification that a single-channel in-line optical amplifier 43, such as an Erbium doped waveguide amplifier, is provided before each optical receiver 14.

The input modules 44 are substantially the same as the input module 16 of the first embodiment, with the following modifications. In this example, the routing apparatus 46 comprises an optical multiplexer 52 and a wavelength selective router, in the form of an arrayed waveguide grating (AWG) 54, in addition to the N optical switches 32. The multiplexer 52 comprises a N:1 optical coupler, its N input ports being respectively coupled to the N optical transmitters 18. The output of the coupler 52, comprising a multiplexed optical signal having N wavelength components, is routed to the AWG 54. The AWG 54 demultiplexes the received multiplexed optical signal and routes each of the individual wavelength components ($\lambda_1$ to $\lambda_N$) to the respective optical switch 32.

Each input module 44 further comprises an N channel label extractor 56. And a 90:10 optical splitter coupled to the output of the coupler 52 and arranged to route 10% of the multiplexed optical signal to the label extractor 56. An optical amplifier 53 is provided to amplify the remaining 90% of the multiplexed optical signal prior to delivery to the AWG 54.

The switch control unit 28 is further operable to generate a routing control signal 48 to provide a destination output mod-ule index for each optical transmitter 18. The optical transmitters 18 are arranged to receive the routing control signal 48 and to apply a destination label to each data cell to be transmitted by a respective optical transmitter 18.

The N channel label extractor 56 is an all-optical label extractor, the principles and operation of which will be well known to the person skilled in the art. The label extractor 56 is arranged to receive part of the multiplexed optical signal from the optical splitter 55 and to optically extract the label providing the destination output module index from each data cell carried by the optical signal. The label extractor 56 is further arranged to generate a further routing control signal 58 for configuring the optical switches 32, to route their respective optical signals to the destination output module 42 identified by the respective destination output module index.

The routing of each data cell through the switch 40 is therefore based on two criteria, namely the destination output module index provided in the label and the wavelength of the optical signal carrying the data cell. The label provided to the data cell thus determines the destination output module 42 for the data cell and the wavelength of the optical signal carrying the data cell determines the destination port (optical receiver 14). Since the optical receivers 14 are fixed wavelength receivers, a biunique relationship holds between the destination port (optical receiver 14) and the wavelength of the optical signal at which the data cell is transmitted.

Figure 3:
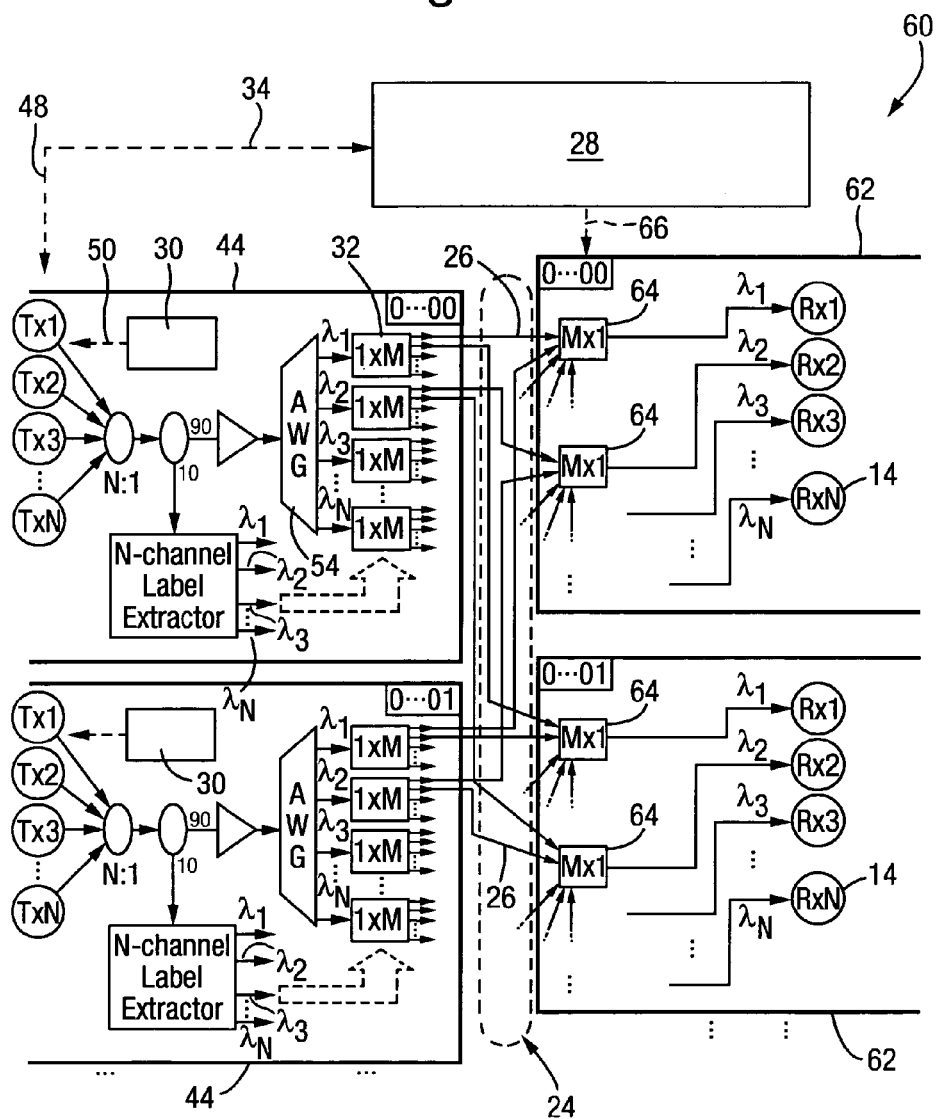
FIG. 3 is a schematic representation of a synchronous packet switch according to a third embodiment of the invention.

A third embodiment of the invention provides a synchronous packet switch 60, as shown in FIG. 3. The synchronous packet switch 60 of this embodiment is substantially the same as the synchronous packet switch 40 of the previous embodiment, with the following modifications. The same reference numbers are retained for corresponding features.

In this example the optical connections comprise solely of optical fibres 26, simplifying the optical backplane 24. The couplers 38 of the previous embodiments are replaced by N M×1 optical switches 64 in each output module 62. The M inputs of each optical switch 64 are coupled via the optical fibres 26 to the respective output ports 22 of the optical switches 32 in the input modules 44. Each optical switch 64 only receives optical signals at one of the N wavelengths ($\lambda_1$ to $\lambda_N$) and the output of each optical switch 64 is connected to the respective one of the optical receivers 14 configured to receive that wavelength. The switch control unit 28 is further operable to generate an additional routing signal 66, provided to the optical switches 64, for configuring the optical switches 64 to route a selected input at its respective wavelength to the respective optical receiver 14. Control of the optical switches 64 is required in order to ensure that each output module 64 has no more than one optical signal entering it at each of the N wavelengths.

Figure 4:
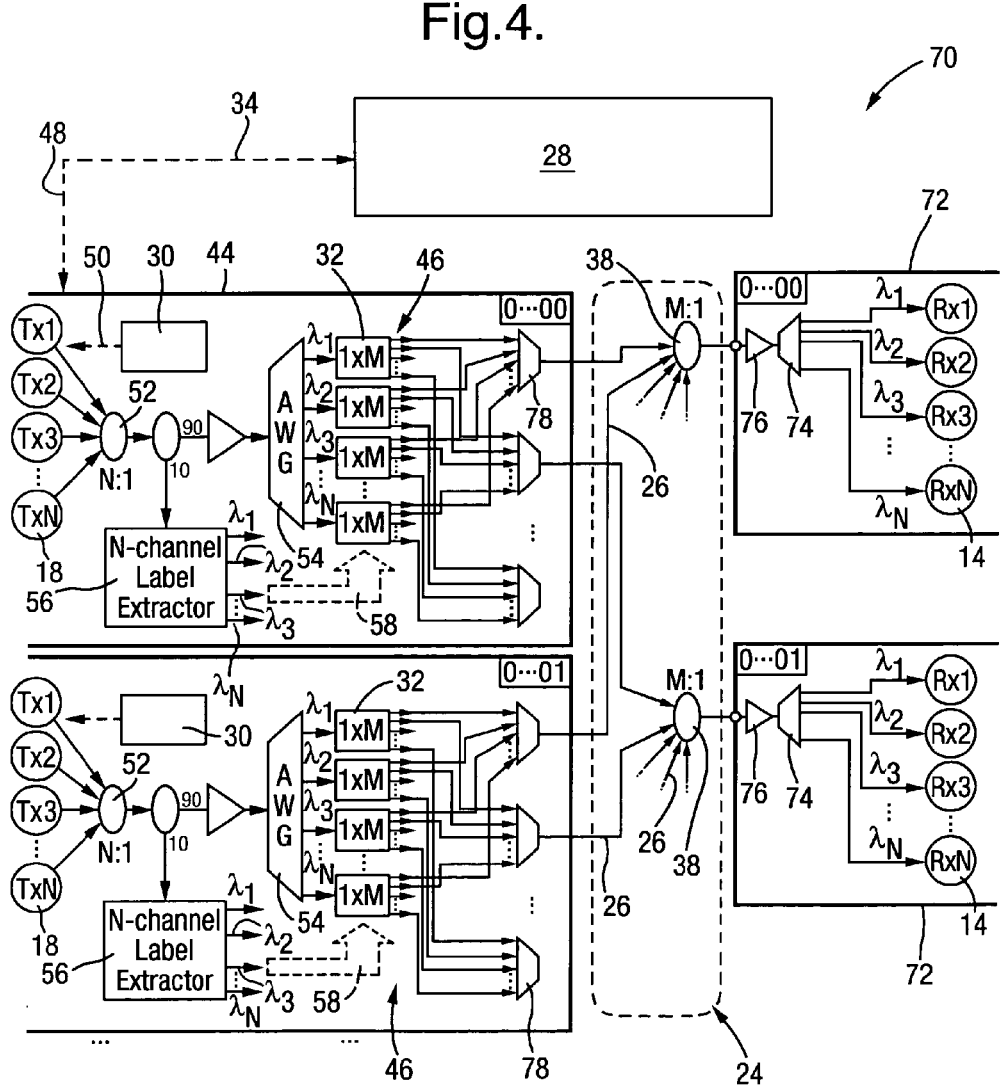
FIG. 4 is a schematic representation of a synchronous packet switch according to a fourth embodiment of the invention.

A fourth embodiment of the invention provides a synchronous packet switch 70 as shown in FIG. 4. The synchronous packet switch 70 of this embodiment is substantially the same as the synchronous packet switch 40 shown in FIG. 2, with the following modifications. The same reference numerals are retained for corresponding features.

In this embodiment the routing apparatus 46 further comprises M output multiplexers, in the form of AWGs 78. Each AWG has N input ports, each for receiving an optical signal at a different one of the N wavelengths. Each input port of an AWG 78 is coupled to an output port of one of the optical switches at the respective wavelength. Each AWG 78 is arranged to multiplex received optical signals for routing to a selected output module 72.

In this example, the optical connections comprise optical fibres 26 and M M:1 optical couplers 38, provided in the optical back plane 24. The number of optical fibre 26 and M:1 couplers 38 is thus reduced compared to the switch 40 of FIG. 2. Each optical coupler 38 is coupled on its input side to the output of each of the AWGs 78 allocated to its respective output module 72. The couplers 38 are arranged to multiplex the received optical signals and direct them to their respective output module 72.

Each output module 72 is provided with a multi-channel optical amplifier 76, in the form of an Erbium doped waveguide amplifier, and an optical de-multiplexer, in the form of an AWG 74. In each output module 72, the AWG 74 is arranged to receive a multiplexed optical signal and to de-multiplex it into optical signals at each of the constituent wavelengths ($\lambda_1$ to $\lambda_N$), the outputs of the AWG 76 being coupled to the respective optical receivers 14 configured to receive the respective wavelengths.

Figure 5:
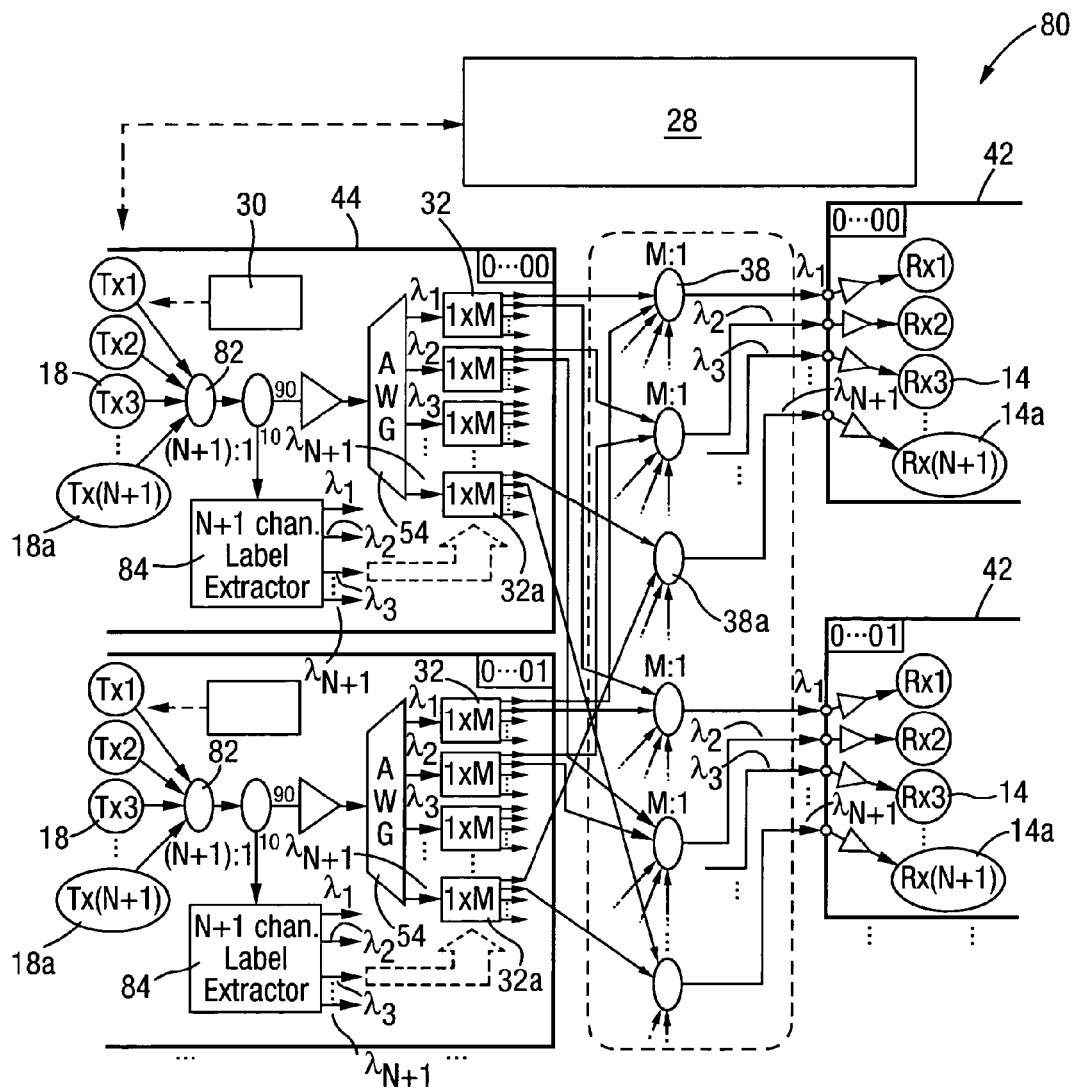
FIG. 5 is a schematic representation of a synchronous packet switch according to a fifth embodiment of the invention.

A fifth embodiment of the invention provides a synchronous packet switch 80 as shown in FIG. 5. The synchronous packet switch 80 is substantially the same as the synchronous packet switch 40 of FIG. 2, with the following modifications. The same reference numbers are retained for corresponding features.

In this embodiment, each input module is provided with a further optical transmitter 18a, which serves as a backup redundancy transmitter to replace one of the main transmitters 18 should one fail. The optical coupler 82 is provided with a further input port, and is thus an (N+1):1 coupler. The label extractor 84 is operable for each of the N+1 channels. The routing apparatus 46 comprises a further 1×M optical switch 32a, which serves as a redundancy element to replace one of the main switches 32 should they fail. The output ports 22 of the redundancy optical switches 32a are coupled to M additional M:1 couplers 38a, which serve to route optical signals at ($\lambda_{N+1}$) from the redundancy transmitter 18a via the redundancy optical switch 32 of each input module 44. Each output module 42 is provided with a redundancy optical receiver 14a, arranged to receive optical signals at ($\lambda_{N+1}$).

In the case of failure of an optical transmitter 18, the module control unit 30 causes the redundancy optical transmitter 18a to tune to the operating wavelength of the broken optical transmitter 18. In the case of failure of an optical switch 32, the wavelength for the broken optical switch can no longer be used, and the switch control unit 28 is operable to amend its allocation of transmitters 18 to receivers 14 to take into account the fact that traffic on the broken wavelength will now be received on ($\lambda_{N+1}$).

Figure 6:
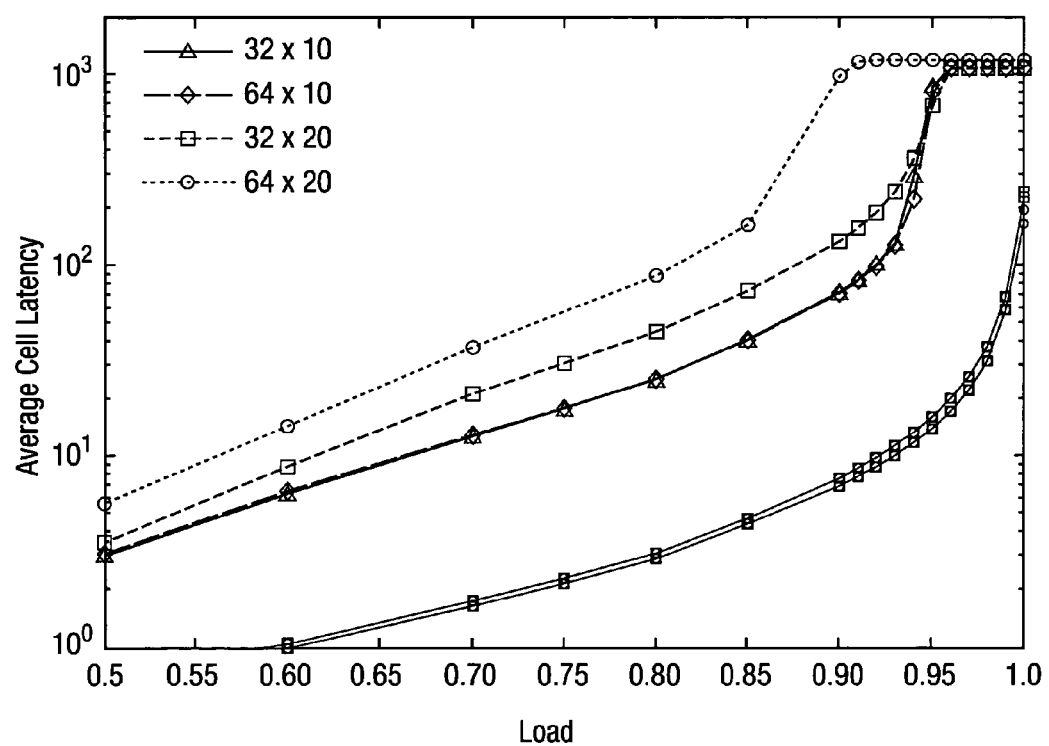
FIG. 6 shows average cell latency as a function of load obtained for switch operation simulations run with various switch configurations (32, 64 cards and 10, 20 wavelengths)
Figure 7:
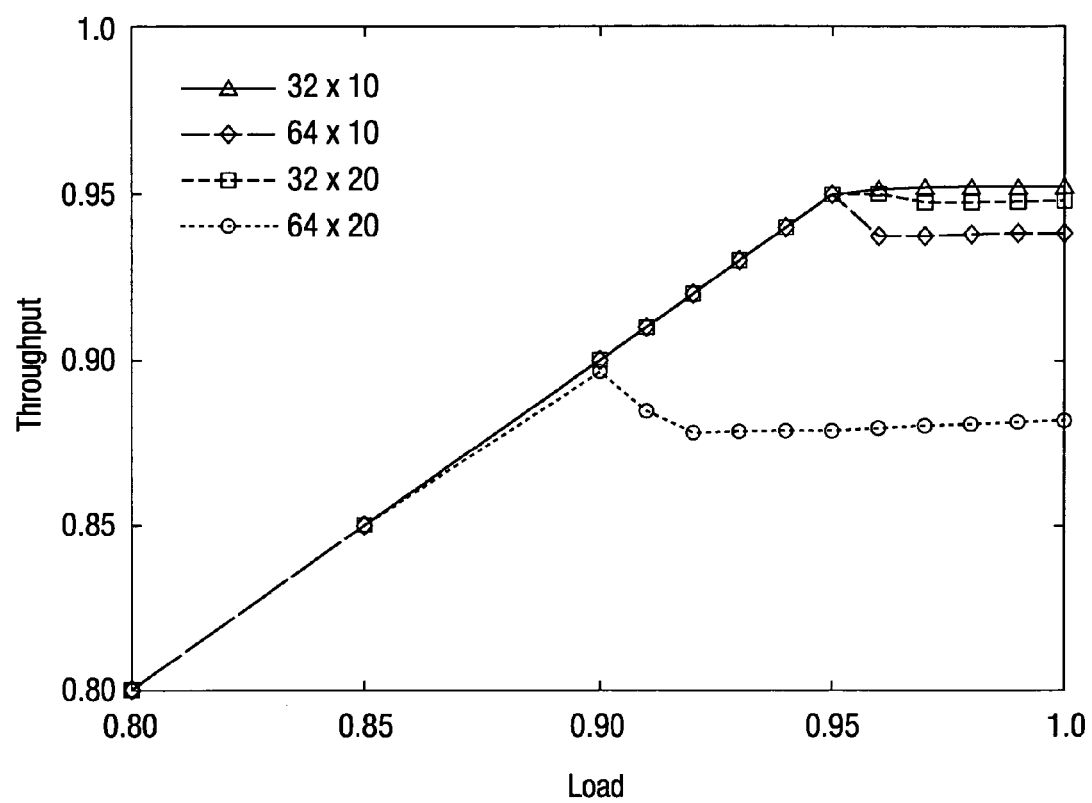
FIG. 7 shows the cell throughput as a function of load for the same switch operation simulations as FIG. 6.

FIG. 6 shows average cell latency as a function of load for a simulation of operation of the synchronous packet switch of FIG. 2 for the following switch configurations: M=32 and N=10 (solid line with square data points); M=64 and N=10 wavelengths (dashed line and circular data points); M=32 and N=20 (dotted line and square data points); and M=64 and N=20 (close dotted line and circular data points). The simulations were run using the iSLIP algorithm for allocating optical transmitters 18 to output modules 42 by the switch control unit 28. The simulations were run with a cell queue depth of 1000 cells for each transmitter 18, causing flattening of the data curves around $10^3$. FIG. 7 shows cell throughput as a function of load for the same switch configurations as for FIG. 6.

Figure 8:
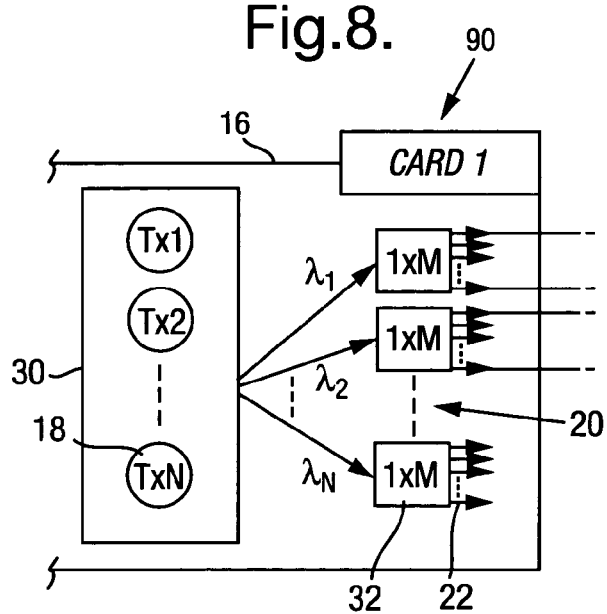
FIG. 8 is a schematic representation of a collector card according to a sixth embodiment of the invention.

Referring to FIG. 8, a sixth embodiment of the invention provides a collector card 90 for a synchronous packet switch. The collector card 90 comprises an input module 16, as described above in relation to FIG. 1. The same reference numbers are applied to corresponding features.

Figure 9:
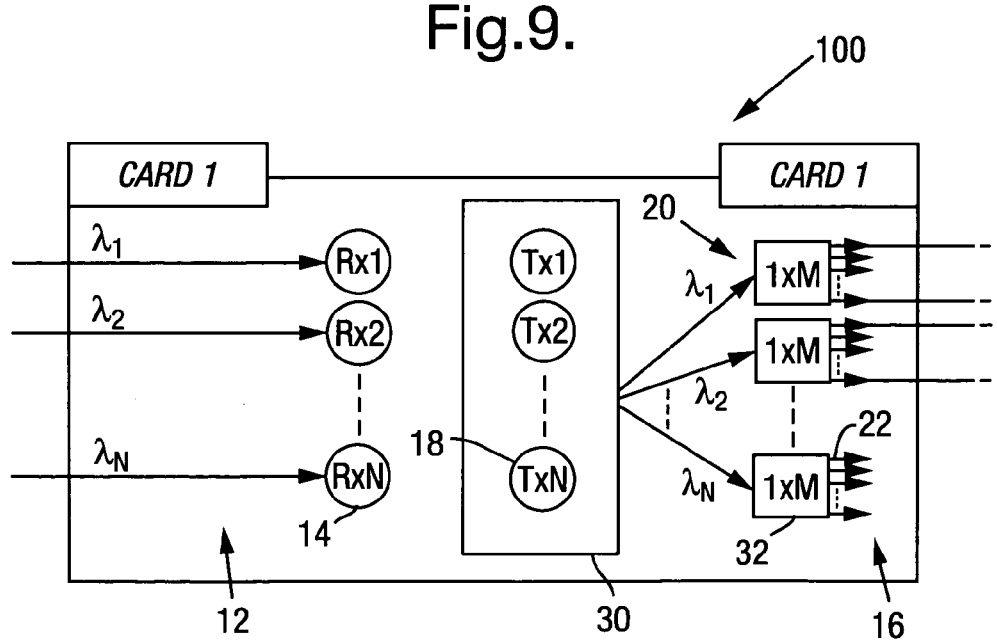
FIG. 9 is a schematic representation of a collector card according to a seventh embodiment of the invention.

A seventh embodiment of the invention provides a collector card 100, as shown in FIG. 9. The collector card 100 comprises an input module 16 and an output module 12, as described above in FIG. 1. The same reference numbers are applied to corresponding features.

Figure 10:
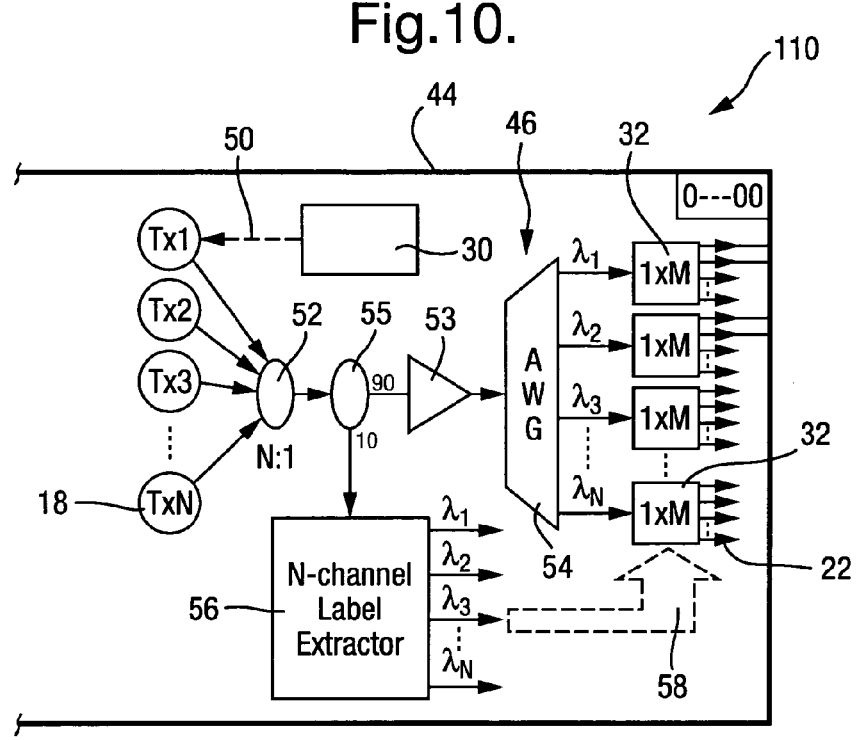
FIG. 10 is a schematic representation of a collector card according to an eighth embodiment of the invention.

Referring to FIG. 10, an eighth embodiment of the invention provides a collector card 110 comprising an input module 44 as described above in relation to FIG. 2. The same reference numbers are used for corresponding features.

Figure 11:
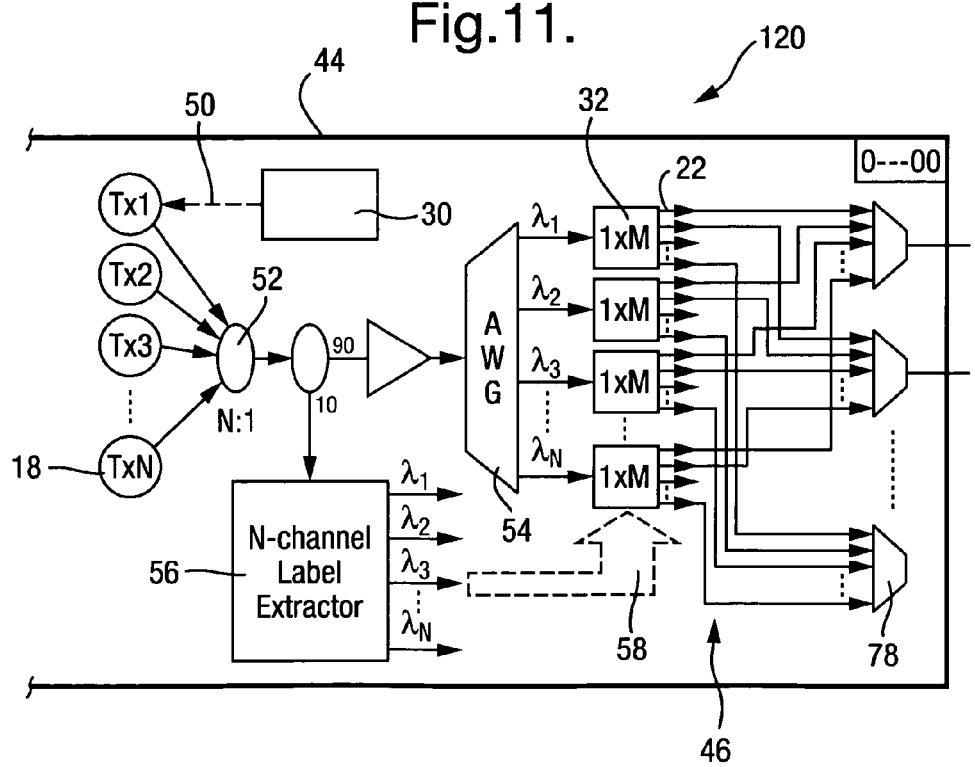
FIG. 11 is a schematic representation of a collector card according to a ninth embodiment of the invention.

FIG. 11 shows a collector card 120 according to a ninth embodiment of the invention. The collector card 120 comprises an input module 44 as described above in FIG. 4. The same reference numerals are used for corresponding features.

Figure 12:
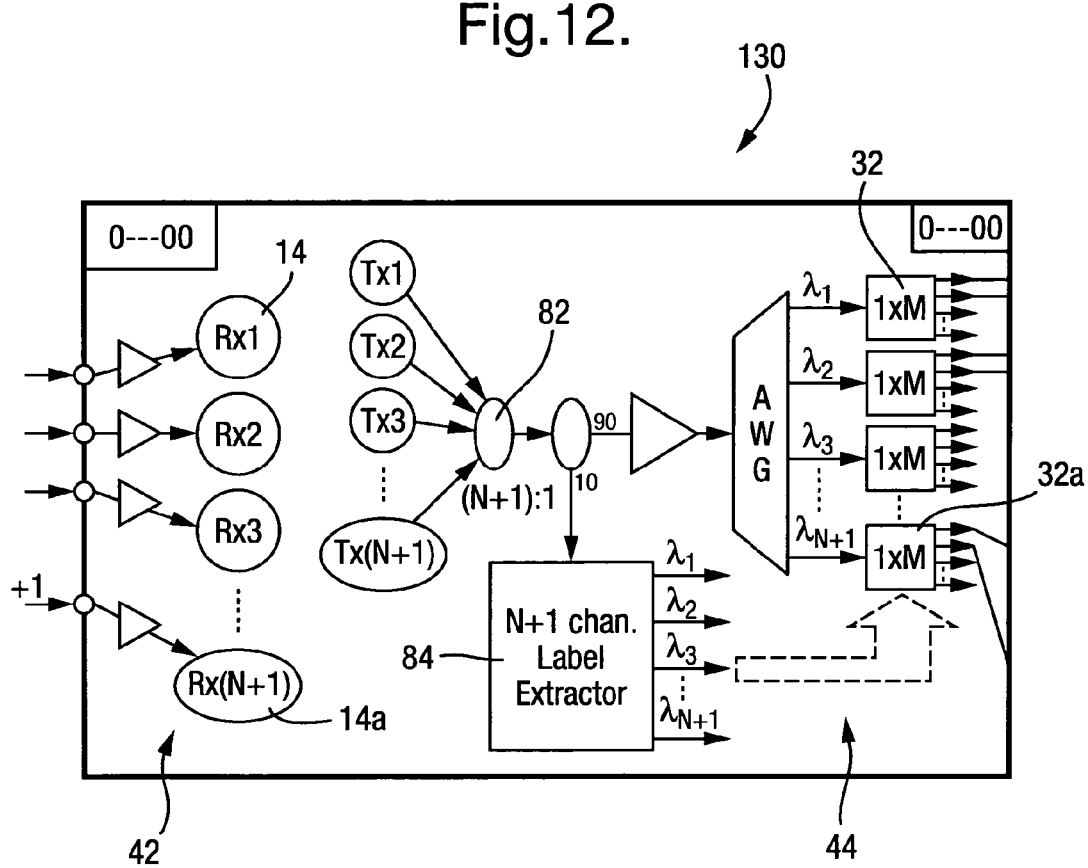
FIG. 12 is a schematic representation of a collector card according to a tenth embodiment of the invention.

FIG. 12 shows a collector card 130 according to a tenth embodiment of the invention. The collector card 130 comprises an input module 44 and an output module 42 as described above in FIG. 5. The same reference numbers are applied to corresponding features.

Figure 13:
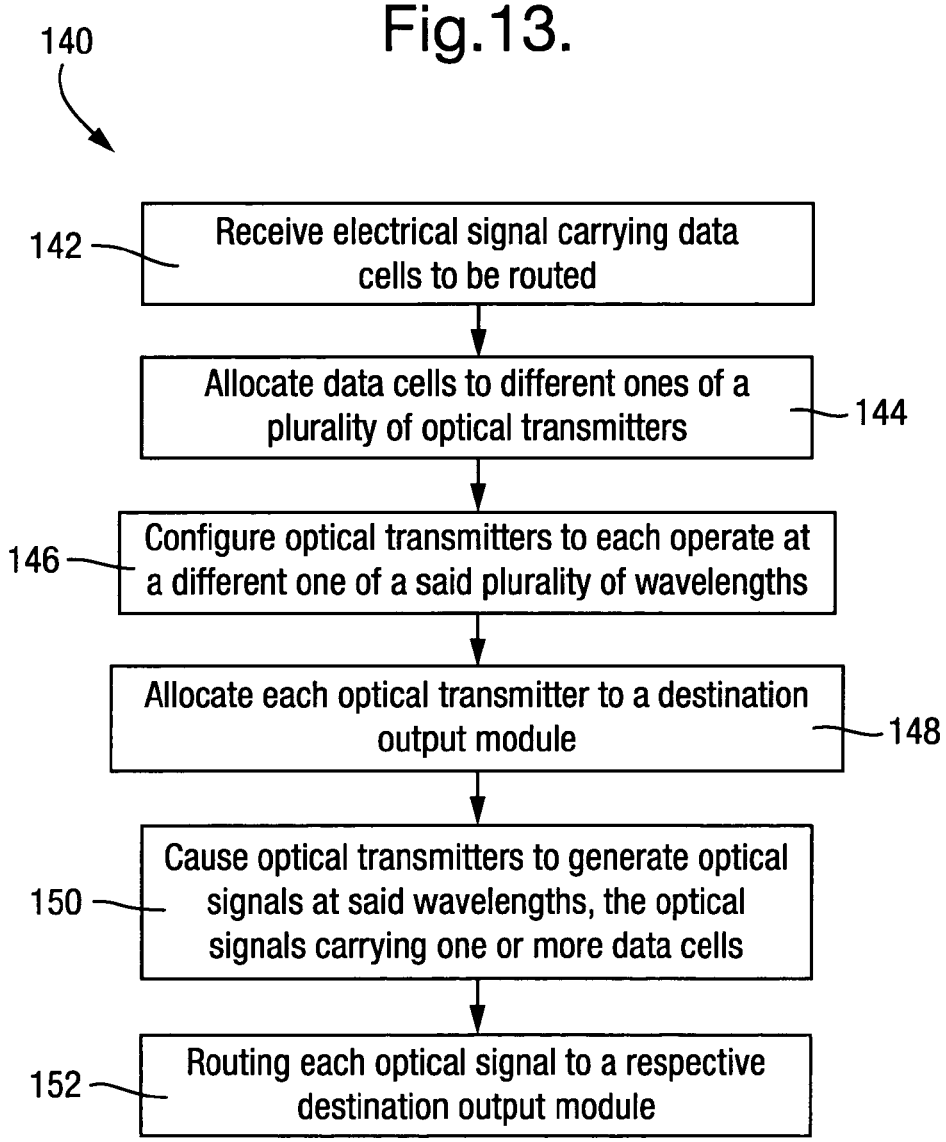
FIG. 13 shows the steps of a method of routing data cells through a synchronous packet switch according to an eleventh embodiment of the invention.

An eleventh embodiment of the invention provides a method 140 of routing data cells through a synchronous packet switch, as illustrated in FIG. 13.

The method 140 comprises:
Receiving at least one electrical signal carrying data cells to be routed 142;
Allocating data cells to different ones of a plurality of optical transmitters of the synchronous packet switch 144;
Configuring the optical transmitters to each operate at a different one of the plurality of wavelengths 146;
Allocating each optical transmitter to a destination output module of the synchronous packet switch 148;
Causing the optical transmitters to generate optical signals at their configured wavelengths, the optical signals carrying one or more data cells 150; and
Routing each optical signal to a respective destination output module 152.

Figure 14:
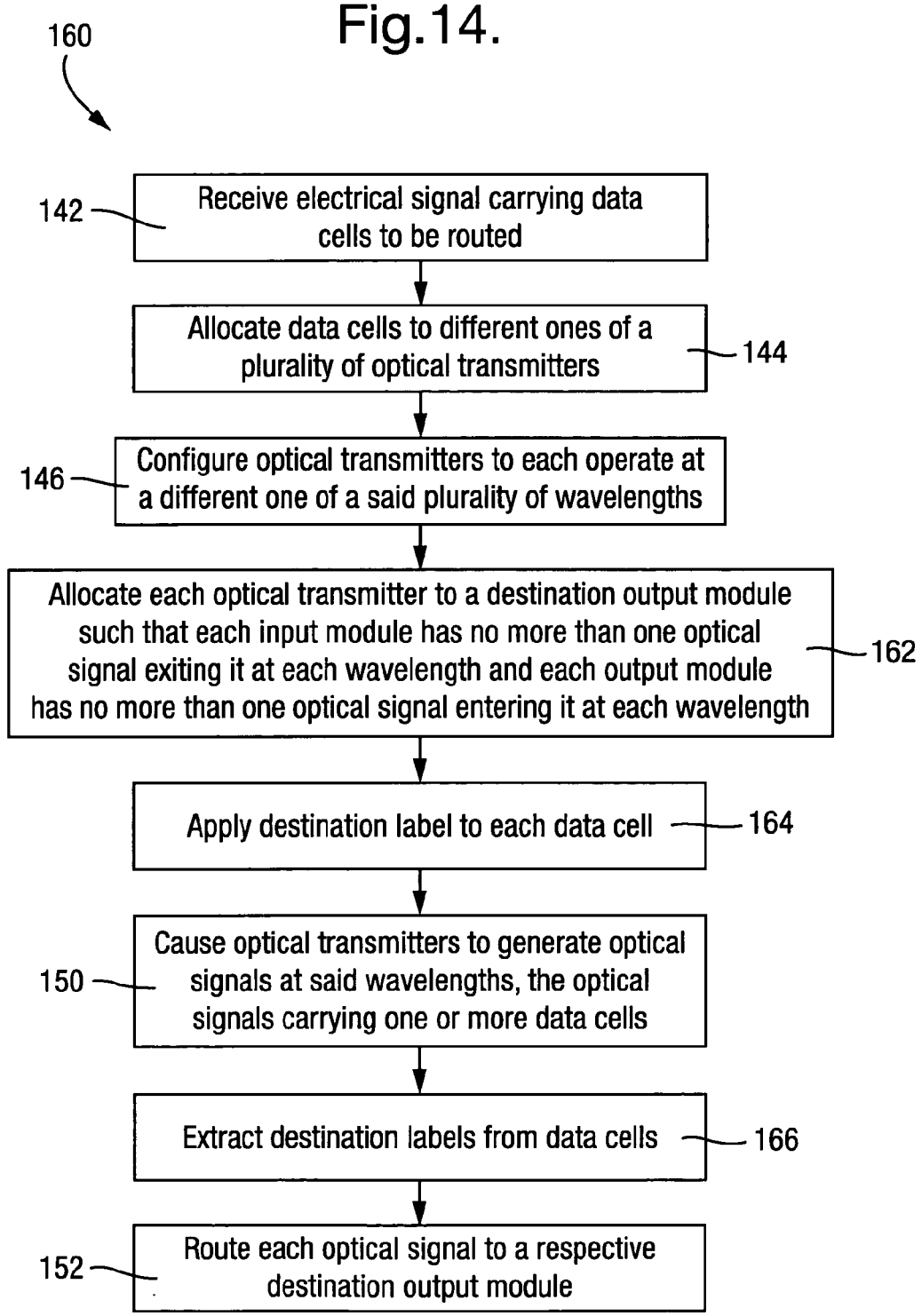
FIG. 14 shows the steps of a method of routing data cells through a synchronous packet switch according to a twelfth embodiment of the invention.

FIG. 14 shows the steps of a method 160 of routing data cells through a synchronous packet switch according to a twelfth embodiment of the invention. The synchronous packet switch comprises a plurality of input modules and a corresponding plurality of output modules, each input module having a second plurality of optical transmitters.

The method 160 comprises:
At the input modules, receiving electrical signals carrying data cells to be routed 142;
For each input module, allocating the data cells to different ones of a plurality of optical transmitters 144;
For each input module, configuring the optical transmitters to each operate at a different one of the second plurality of wavelengths 146;
Allocating each optical transmitter to a destination output module such that each input module has no more than one optical signal exiting it at each wavelength and each output module has no more than one optical signal entering it at each wavelength 162;
Applying a destination label to each data cell, identifying the destination output module to which the data cell is to be routed 164;
Causing the optical transmitters to generate optical signals at their configured wavelengths, the optical signals carrying one or more data cells 150;
Extracting the destination labels from the data cells 166; and
Routing each optical signal to a respective destination output module 152.

In this example, the destination labels are optically extracted from the data cells carried by the optical signals. The optical signals are routed to their respective destination output modules according to the destination labels.

A thirteenth embodiment of the invention provides a method 170 of routing data cells through a synchronous packet switch, as shown in FIG. 15. The method 170 is substantially the same as the method 160 of the previous embodiment with the following modifications. The same reference numerals are retained for corresponding steps.

In this embodiment, after the step of allocating each optical transmitter to a destination output module 162, the method comprises the steps of generating a routing control signal for providing a destination label to each data cell and providing the routing control signal to the optical transmitters 172, and applying the destination labels to the data cells at the optical transmitters 174.

The invention claimed is:

1. A synchronous packet switch comprising:
a first number of two or more output modules each comprising a second number of two or more optical receivers each configured to receive optical signals at a different one of the second number of two or more wavelengths;
the first number of two or more input modules arranged to receive electrical signals carrying data cells to be routed, each of said input modules comprising:
the second number of two or more optical transmitters each being operable to generate an optical signal carrying one or more of said data cells, said optical transmitters being configurable such that each of the optical transmitters is operable to generate one of the optical signals at the different one of the second number of two or more wavelengths; and
a routing apparatus comprising a plurality of output ports, wherein at least one of the output ports is allocated to each said output module, said routing apparatus being arranged to receive said optical signals at said different wavelengths and being configurable to route each said received optical signal separately to a selected output port;
and the said switch further comprising: wherein a third number of two or more optical connections are arranged to couple the output ports to their respective output modules; and
a switch control unit arranged to control routing of said optical signals from said optical transmitters to said output modules, and to generate a routing control signal for configuring the routing apparatus to route, for each of the optical transmitters, said optical signal generated from said optical transmitter to a selected one of said output ports,
wherein each said routing apparatus comprises a plurality of 1×M optical switches each having one input port and M output ports, each of said optical receivers in said output modules has a different one of said M output ports allocated to it, and each of the optical switches being allocated to a different one of the second number of two or more wavelengths and being configurable to route a received optical signal to a selected one of said M output ports.

2. The synchronous packet switch as claimed in claim 1, wherein said optical transmitters are arranged to receive said routing control signal and to provide a destination label according to said routing control signal to each of the received data cells to be transmitted, and each of the input modules further comprises a label extractor arranged to extract destination labels from transmitted ones of said data cells carried by said optical signals and to generate a further routing control signal for configuring said routing apparatus.

3. The synchronous packet switch as claimed in claim 1, wherein said routing apparatus is arranged to receive said routing control signal.

4. The synchronous packet switch as claimed in claim 1, wherein each said input module further comprises a module control unit arranged to assign a received data cell to one of the second number of two or more wavelengths for transmission to one of said output modules.

5. The synchronous packet switch as claimed in claim 4, wherein said optical transmitters comprise tunable optical transmitters, and said module control unit is operable to assign a different one of the second number of two or more wavelengths to each of said optical transmitters and to generate a wavelength control signal for configuring each of said optical transmitters to operate at said assigned wavelength.

6. The synchronous packet switch as claimed in claim 5, wherein each said module control unit is further arranged to generate a wavelength assignment signal for identifying said one of the wavelengths assigned to each of its respective said optical transmitters, and said switch control unit is arranged to receive said wavelength assignment signal, and, for each of the wavelengths, to allocate to one of said output modules each of the optical transmitters that the wavelength is assigned to, wherein said optical transmitters are allocated to said output modules such that no more than one said optical signal at each of the wavelengths exits each input module, and no more than one said optical signal at each of the wavelengths enters each output module, and said routing control signal is for configuring said routing apparatus according to said allocation of said optical transmitters to said output modules.

7. The synchronous packet switch as claimed in claim 1, wherein the optical connections are arranged to couple the output ports of a fourth number of two or more input modules including the first plurality of input modules to a said fourth number of two or more output modules including the first number of two or more output modules, wherein said first number is less than or equal to said fourth number.

8. A collector card for a synchronous packet switch, said collector card comprising an input module arranged to receive electrical signals carrying data cells, said input module comprising:
a plurality of optical transmitters each being operable to generate an optical signal carrying one or more received data cells, said optical transmitters being configurable such that each optical transmitter is operable to generate said optical signal at a different one of a plurality of wavelengths;
a routing apparatus comprising a plurality of output ports and being arranged to receive said optical signals at said different wavelengths and being configurable to route separately each of the optical signals received to a selected one of the output ports; and
a module control unit arranged to assign a received data cell to one of said plurality of wavelengths for transmission, wherein said optical transmitters comprise tunable optical transmitters and said module control unit is operable to assign a different one of said plurality of wavelengths to each of said optical transmitters and to generate a wavelength control signal for configuring each of said transmitters to operate at said assigned wavelength.

9. The collector card as claimed in claim 8, wherein said optical transmitters are arranged to receive a routing control signal and to provide a destination label according to said routing control signal to each said received data cell to be transmitted, and each said input module further comprises a label extractor arranged to extract said destination labels from transmitted ones of said data cells carried by said optical signals and to generate a further routing control signal for configuring said routing apparatus.

10. The collector card as claimed in claim 8, wherein said collector card further comprises an output module comprising a plurality of optical receivers each configured to receive optical signals at a different one of said plurality of wavelengths.

* * * * *